United States Patent
Ozawa et al.

(10) Patent No.: US 12,280,693 B2
(45) Date of Patent: Apr. 22, 2025

(54) POWER MANAGEMENT SYSTEM, ELECTRIC VEHICLE SUPPLY EQUIPMENT, SERVER, AND ADJUSTMENT METHOD OF POWER SUPPLY AND DEMAND BALANCE

(71) Applicant: TOYOTA JIDOSHA KABUSHIKI KAISHA, Toyota (JP)

(72) Inventors: Tamaki Ozawa, Toyota (JP); Toru Nakamura, Toyota (JP); Akinori Morishima, Naka-gun (JP); Yusuke Horii, Nagoya (JP); Wataru Matsumura, Ichihara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 501 days.

(21) Appl. No.: 17/664,444

(22) Filed: May 23, 2022

(65) Prior Publication Data

US 2023/0035591 A1  Feb. 2, 2023

(30) Foreign Application Priority Data

Jul. 30, 2021  (JP) .................. 2021-125865

(51) Int. Cl.
| | |
|---|---|
| B60L 55/00 | (2019.01) |
| B60L 53/62 | (2019.01) |
| B60L 53/65 | (2019.01) |
| B60L 53/68 | (2019.01) |

(52) U.S. Cl.
CPC .............. *B60L 55/00* (2019.02); *B60L 53/62* (2019.02); *B60L 53/65* (2019.02); *B60L 53/68* (2019.02); *B60L 2240/72* (2013.01)

(58) Field of Classification Search
CPC .......... B60L 55/00; B60L 53/62; B60L 53/65; B60L 53/68; B60L 2240/72; B60L 53/63; B60L 53/67; Y02T 10/70; Y02T 90/167; H02J 3/18; H02J 3/322; H02J 3/144
See application file for complete search history.

(56) References Cited

U.S. PATENT DOCUMENTS

| 8,509,976 B2 | 8/2013 | Kempton | |
| 2018/0052478 A1* | 2/2018 | Varma | H02J 3/18 |
| 2021/0039516 A1* | 2/2021 | Brombach | H02J 3/12 |

FOREIGN PATENT DOCUMENTS

| JP | 2012-016072 A | 1/2012 | |
| JP | 5662713 B2 * | 2/2015 | B60L 11/007 |

* cited by examiner

*Primary Examiner* — Yuhui R Pan
(74) *Attorney, Agent, or Firm* — Finnegan, Henderson, Farabow, Garrett and Dunner, LLP

(57) ABSTRACT

A power management system includes a first server configured to manage electric vehicle supply equipment in a microgrid and a second server configured to manage power supply and demand balance of a power system. The electric vehicle supply equipment is configured to execute a charging and discharging operation that suppresses a voltage fluctuation of the microgrid by exchanging power between the microgrid and a vehicle, and a reactive power compensation operation that suppresses a voltage fluctuation of the power system by controlling reactive power of the microgrid.

5 Claims, 4 Drawing Sheets

POWER MANAGEMENT SYSTEM, ELECTRIC VEHICLE SUPPLY EQUIPMENT, SERVER, AND ADJUSTMENT METHOD OF POWER SUPPLY AND DEMAND BALANCE

CROSS-REFERENCE TO RELATED APPLICATION

This application claims priority to Japanese Patent Application No. 2021-125865 filed on Jul. 30, 2021, incorporated herein by reference in its entirety.

BACKGROUND

1. Technical

The present disclosure relates to a power management system, electric vehicle supply equipment, a server, and an adjustment method of power supply and demand balance.

2. Description of Related Art

In a power system, it is requested to stabilize a voltage of the power system without being affected by load fluctuations. Known devices that suppress voltage fluctuations include a load ratio control transformer (LRT), a step voltage regulator (SVR), a static var compensator (SVC), and the like. For example, the static var compensator disclosed in Japanese Unexamined Patent Application Publication No. 2012-16072 (JP 2012-16072 A) has both a static power compensation function for suppressing the voltage fluctuation in a power system and a vehicle charging function.

SUMMARY

A microgrid is connected to the power system, and power is transmitted and received between the microgrid and the power system. Further, various power adjustment resources (a generator, a naturally fluctuating power source, a power storage system, electric vehicle supply equipment, a vehicle, and the like) are electrically connected to the inside of the microgrid.

When the voltage fluctuation occurs in the power system, a power adjustment resource in the microgrid may be requested to suppress the voltage fluctuation in the power system. On the other hand, although the power supply and demand balance is maintained in the power system as a whole, the local voltage fluctuation in the microgrid may occur. The present inventors have focused on the fact that how to appropriately deal with the voltage fluctuation (the voltage fluctuation in the power system and the voltage fluctuation in the microgrid) that can be generated in such different scopes can be a problem.

The present disclosure provides a power management system, electric vehicle supply equipment, a server, and an adjustment method of power supply and demand balance that appropriately suppress the voltage fluctuation of the power system and the voltage fluctuation of the microgrid according to a situation.

The power management system according to a first aspect of the present disclosure includes a microgrid. The microgrid is configured to include a plurality of power adjustment resources and transmit and receive power to and from a power system. The power management system includes a first server configured to manage the power adjustment resources in the microgrid and a second server configured to manage power supply and demand balance of the power system. The power adjustment resources include the electric vehicle supply equipment. The electric vehicle supply equipment is configured to execute a charging and discharging operation that suppresses a voltage fluctuation of the microgrid by exchanging power between the microgrid and a vehicle, and a reactive power compensation operation that suppresses a voltage fluctuation of the power system by controlling reactive power of the microgrid. The electric vehicle supply equipment is configured to execute the charging and discharging operation in response to a request from the first server when the vehicle is electrically connected to the electric vehicle supply equipment, and execute the reactive power compensation operation in response to a request from the second server when the vehicle is not electrically connected to the electric vehicle supply equipment.

In the first aspect, the electric vehicle supply equipment executes the charging and discharging operation in response to a request from the first server when the vehicle is electrically connected to the electric vehicle supply equipment, and executes the reactive power compensation operation in response to a request from the second server when the vehicle is not electrically connected to the electric vehicle supply equipment. That is, the server that can control the electric vehicle supply equipment changes depending on whether the vehicle is electrically connected to the electric vehicle supply equipment. When the vehicle is electrically connected to the electric vehicle supply equipment, the first server causes the electric vehicle supply equipment to execute the charging and discharging operation, so that the voltage fluctuation of the microgrid can be suppressed. When the vehicle is not electrically connected to the electric vehicle supply equipment, the second server causes the electric vehicle supply equipment to execute the reactive power compensation operation, so that the voltage fluctuation of the power system can be suppressed. As described above, the electric vehicle supply equipment can be effectively used in at least one of a case where the vehicle is electrically connected to the electric vehicle supply equipment or a case where the vehicle is not electrically connected to the electric vehicle supply equipment. Therefore, according to the first aspect, the voltage fluctuation of the power system and the voltage fluctuation of the microgrid can be appropriately suppressed depending on the situation.

In the first aspect, the electric vehicle supply equipment may be configured to determine whether the vehicle is electrically connected to the electric vehicle supply equipment. When the electric vehicle supply equipment determines that the vehicle is electrically connected to the electric vehicle supply equipment, the electric vehicle supply equipment may give control authority of the electric vehicle supply equipment to the first server. When the first server has the control authority and a voltage fluctuation occurs in the microgrid, the first server may output a request to the electric vehicle supply equipment.

In the first aspect, when the electric vehicle supply equipment determines that the vehicle is not electrically connected to the electric vehicle supply equipment, the electric vehicle supply equipment may give the control authority of the electric vehicle supply equipment to the second server. When the second server has the control authority and a voltage fluctuation occurs in the microgrid, the second server may output a request to the electric vehicle supply equipment.

In the first aspect, the first server may be configured to determine whether the vehicle is electrically connected to the electric vehicle supply equipment. When the first server determines that the vehicle is electrically connected to the electric vehicle supply equipment and a voltage fluctuation occurs in the microgrid, the first server may output the request to the electric vehicle supply equipment.

In the first aspect, when the first server determines that the vehicle is not electrically connected to the electric vehicle supply equipment, the first server may give the control authority of the electric vehicle supply equipment to the second server. When the second server has the control authority and a voltage fluctuation occurs in the microgrid, the second server may output a request to the electric vehicle supply equipment.

In the first aspect, the second server may be configured to pay compensation to the first server according to the number of times or a period in which the electric vehicle supply equipment executes the reactive power compensation operation in response to a request from the second server. The first server may be configured to obtain the compensation.

According to the first aspect, the first server (the operating entity of the microgrid) can receive compensation from the second server for lending the electric vehicle supply equipment to the second server (generally power company). Therefore, the first server can be given an incentive for lending the electric vehicle supply equipment to the second server.

Electric vehicle supply equipment according to a second aspect of the present disclosure is electrically connected to a microgrid that transmits and receives power to and from a power system. The electric vehicle supply equipment includes a processor and a memory that stores a program executable by the processor. The processor gives control authority of the electric vehicle supply equipment to a first server that manages power supply and demand balance of the microgrid when a vehicle is electrically connected to the electric vehicle supply equipment, and executes a charging and discharging operation with the vehicle in response to a request from the first server. On the other hand, the processor gives the control authority to a second server that manages power supply and demand balance of the power system when the vehicle is not electrically connected to the electric vehicle supply equipment, and executes a reactive power compensation operation to suppress a voltage fluctuation in the power system in response to a request from the second server.

According to the second aspect, in the same manner as the first aspect, the voltage fluctuation of a power grid can be suppressed by appropriately using the power adjustment resource.

A server according to a third aspect of the present disclosure manages power supply and demand balance of a microgrid that transmits and receives power to and from a power system. The server includes a processor and a memory that stores a program executable by the processor. The microgrid includes electric vehicle supply equipment. The electric vehicle supply equipment is configured to execute a charging and discharging operation that suppresses a voltage fluctuation of the microgrid by exchanging power between the microgrid and a vehicle, and a reactive power compensation operation that suppresses a voltage fluctuation of the power system by controlling reactive power of the microgrid. The processor is configured to output a request to execute the charging and discharging operation to the electric vehicle supply equipment when the vehicle is electrically connected to the electric vehicle supply equipment. The processor is configured to give control authority of the electric vehicle supply equipment to another server configured to output a request to execute the reactive power compensation operation to the electric vehicle supply equipment when the vehicle is not electrically connected to the electric vehicle supply equipment.

According to the third aspect, in the same manner as the first aspect, the voltage fluctuation of the power system and the voltage fluctuation of the microgrid can be appropriately suppressed depending on the situation.

In the third aspect described above, the server may be configured to obtain compensation from the other server according to the number of times or a period in which the control authority is given to the other server.

According to the third aspect, in the same manner as the first aspect, the first server can be given an incentive for lending the electric vehicle supply equipment to the second server.

An adjustment method of power supply and demand balance according to a fourth aspect of the present disclosure uses electric vehicle supply equipment in a microgrid that transmits and receives power to and from a power system. The adjustment method of power supply and demand balance gives control authority of the electric vehicle supply equipment to a first server that manages power supply and demand balance of the microgrid when a vehicle is electrically connected to the electric vehicle supply equipment, and executes, by the electric vehicle supply equipment, a charging and discharging operation with the vehicle in response to a request from the first server. The adjustment method of power supply and demand balance further gives the control authority of the electric vehicle supply equipment to a second server that manages power supply and demand balance of the power system when the vehicle is not electrically connected to the electric vehicle supply equipment, and executes, by the electric vehicle supply equipment, a reactive power compensation operation to suppress a voltage fluctuation in the power system in response to a request from the second server.

According to the fourth aspect, in the same manner as the first aspect, the voltage fluctuation of the power system and the voltage fluctuation of the microgrid can be appropriately suppressed depending on the situation.

Therefore, according to the present aspect, the voltage fluctuation of the power system and the voltage fluctuation of the microgrid can be appropriately suppressed depending on the situation.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
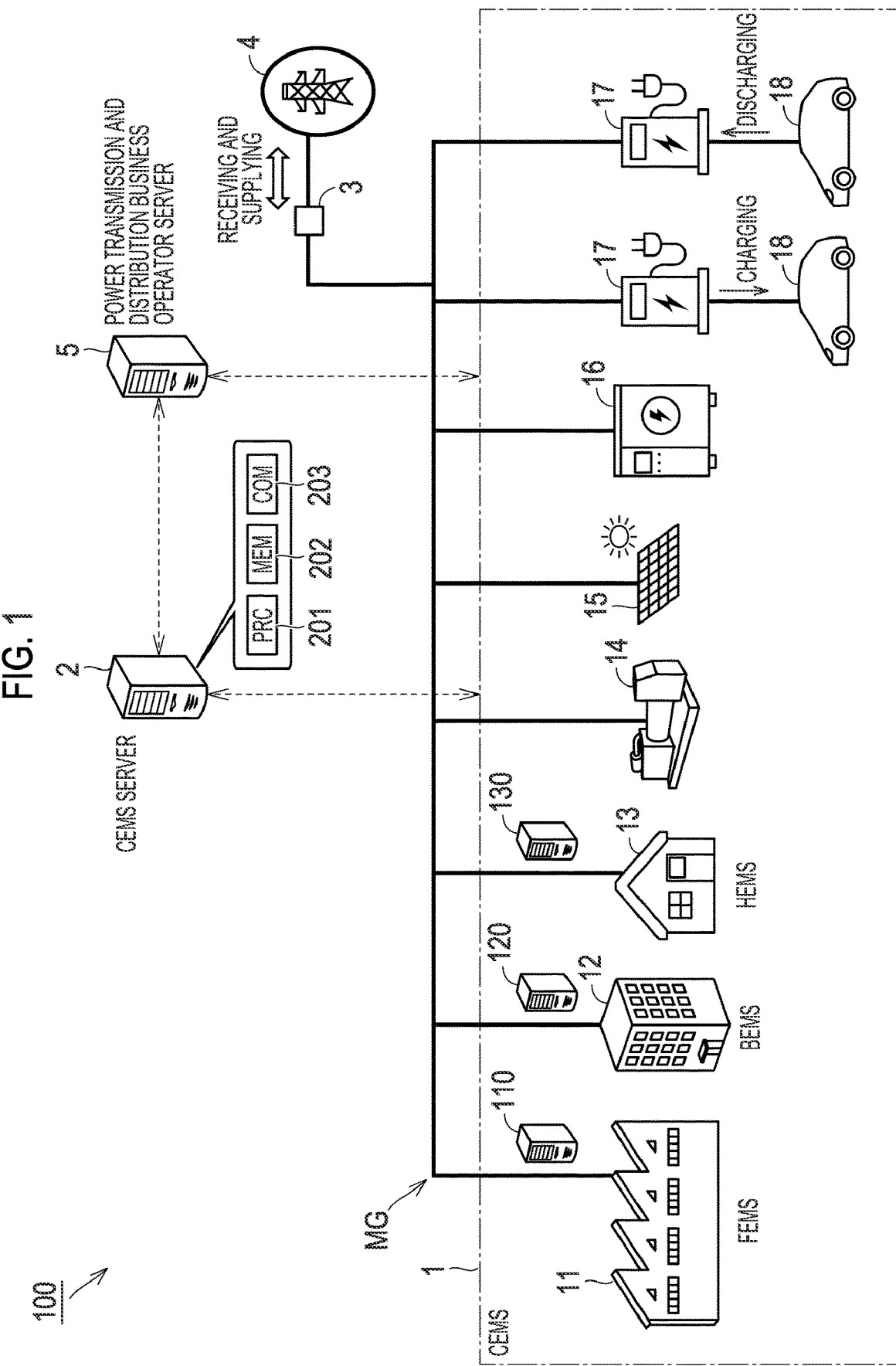
FIG. 1 is a diagram showing a schematic configuration of a power management system according to an embodiment of the present disclosure.

Hereinafter, embodiments of the present disclosure will be described in detail with reference to the drawings. The same or corresponding parts in the drawings are designated by the same reference numerals, and the description thereof will not be repeated.

Overall Configuration of Power Management System

FIG. 1 is a diagram showing a schematic configuration of a power management system according to an embodiment of the present disclosure. A power management system 100 includes a CEMS 1, a CEMS server 2, power receiving and transforming equipment 3, a power system 4, and a power transmission and distribution business operator server 5. The CEMS means a community energy management system or a city energy management system.

The CEMS 1 includes a factory energy management system (FEMS) 11, a building energy management system (BEMS) 12, a home energy management system (HEMS) 13, and a generator 14, a naturally fluctuating power source 15, a power storage system (energy storage system: ESS) 16, electric vehicle supply equipment (EVSE) 17, and a vehicle 18. In the CEMS 1, a microgrid MG is constructed by the components described above.

The FEMS 11 is a system that manages the supply and demand of power used in a factory. The FEMS 11 includes a factory building (including a lighting fixture, air conditioning equipment, and the like), industrial equipment (production line and the like), and the like operated by power supplied from the microgrid MG. Although not shown, the FEMS 11 may include power generation equipment (a generator, a solar panel, and the like) installed in the factory. The power generated by the power generation equipment may be supplied to the microgrid MG. The FEMS 11 further includes a FEMS server 110 capable of bidirectional communication with the CEMS server 2.

The BEMS 12 is a system that manages the supply and demand of power used in a building, such as an office or a commercial facility. The BEMS 12 includes a lighting fixture and air conditioning equipment installed in the building. The BEMS 12 may include the power generation equipment (a solar panel, and the like) or may include a cold heat source system (a waste heat recovery system, a heat storage system, and the like). The BEMS 12 further includes a BEMS server 120 capable of bidirectional communication with the CEMS server 2.

The HEMS 13 is a system that manages the supply and demand of power used at home. The HEMS 13 includes a household apparatus (a lighting apparatus, an air conditioner, other electric appliances, and the like) operated by power supplied from the microgrid MG. Further, the HEMS 13 may include a solar panel, a household heat pump system, a household cogeneration system, a household storage battery, and the like. The HEMS 13 further includes a HEMS server 130 capable of bidirectional communication with the CEMS server 2.

The generator 14 is power generation equipment that does not depend on weather conditions, and outputs the generated power to the microgrid MG. The generator 14 may include a steam turbine generator, a gas turbine generator, a diesel engine generator, a gas engine generator, a biomass generator, a stationary fuel cell, and the like. The generator 14 may include a cogeneration system that uses the heat generated during power generation.

The naturally fluctuating power source 15 is power generation equipment with a power generation output fluctuating depending on the weather conditions, and outputs the generated power to the microgrid MG. Although photovoltaic power generation equipment (a solar panel) is illustrated in FIG. 1, the naturally fluctuating power source 15 may include wind power generation equipment in place of or in addition to the photovoltaic power generation equipment.

The power storage system 16 is a stationary power source that stores power generated by a naturally fluctuating power source 15 and the like. The power storage system 16 is a secondary battery, for example, a lithium ion battery or a nickel hydrogen battery of a battery (a recycled product) used in a vehicle. However, the power storage system 16 is not limited to the secondary battery, and may be a power-to-gas apparatus that produces gaseous fuel (hydrogen, methane, and the like) using surplus power.

The electric vehicle supply equipment 17 may be a vehicle charger (electric vehicle supply equipment (EVSE)) installed at home, or may be a commercial or public charging station. The electric vehicle supply equipment 17 is electrically connected to the microgrid MG, and is configured to be capable of charging and discharging (power supply) with the microgrid MG.

Specifically, the vehicle 18 is a plug-in hybrid vehicle (PHV), an electric vehicle (EV), and the like. The vehicle 18 is configured to be capable of one or both of external charging and external power supply. That is, the vehicle 18 is configured to be capable of supplying power from the microgrid MG to the vehicle 18 (external charging) when a charging cable 19 is connected to an inlet (not shown) of the vehicle 18. Further, the vehicle 18 may be configured to be capable of supplying power from the vehicle 18 to the microgrid MG (external power supply) when the charging cable 19 is connected to an outlet (not shown) of the vehicle 18.

In the example shown in FIG. 1, the number of the FEMS 11, the BEMS 12, the HEMS 13, the generator 14, the naturally fluctuating power source 15, and the power storage system 16 included in the CEMS 1 is one, but the included number of the system or equipment may be optional. The CEMS 1 may include a plurality of the systems or equipment, or may include systems or equipment not included in the CEMS 1. Since each of the FEMS 11 (factory building, industrial equipment, and the like), the BEMS 12 (a lighting fixture, air conditioning equipment, and the like), the HEMS 13 (a household apparatus, and the like), the generator 14, the naturally fluctuating power source 15, the power storage system 16, the electric vehicle supply equipment 17, and the vehicle 18 included in the CEMS 1 is an example of a "power adjustment resource" according to the present disclosure, the system or equipment is also referred to as the "power adjustment resource" below unless otherwise specified.

The CEMS server 2 is a computer that manages the power adjustment resource in the CEMS 1. The CEMS server 2 includes a control device 201, a storage device 202, and a communication device 203. The control device 201 includes a processor and is configured to execute a predetermined arithmetic processing. The storage device 202 includes a memory that stores a program executed by the control device 201, and stores various information (a map, a relational expression, a parameter, and the like) used in the program. Further, the storage device 202 includes a database and stores data (a power generation history, a power consumption history, and the like) related to the power of the system or equipment included in the CEMS 1. The communication device 203 includes a communication interface and is configured to communicate with an external device (another server and the like).

The CEMS server 2 may be an aggregator server. An aggregator is an electricity business operator that bundles a plurality of power adjustment resources to provide energy management services. The CEMS server 2 is an example of the "first server" or "server" according to the present disclosure. Further, servers 110, 120, 130 included in each system of the FEMS 11, the BEMS 12, and the HEMS 13 can be regarded as an example of the "first server" or "server" according to the present disclosure.

The power receiving and transforming equipment 3 is provided at an interconnection point (a power receiving point) of the microgrid MG, and is configured to be capable of switching parallel (connection) and parallel-off (disconnection) between the microgrid MG and the power system 4. Although not shown, the power receiving and transforming equipment 3 includes a switchgear on a high voltage side (a primary side), a transformer, a protection relay, a measuring apparatus, and a control device. When the microgrid MG is connected to the power system 4, the power receiving and transforming equipment 3 receives alternating current power of, for example, a special high voltage (a voltage exceeding 7000 V) from the power system 4 and steps down the received power to supply the power to the microgrid MG.

The power system 4 is a power grid constructed by a power plant and power transmission and distribution equipment. In the embodiment, the power company serves as both a power generation business operator and a power transmission and distribution business operator. The power company is an example of a general power transmission and distribution business operator and an example of an administrator of the power system 4, and maintains and manages the power system 4.

The power transmission and distribution business operator server 5 is a computer that belongs to the power transmission and distribution business operator (power company) and manages the power supply and demand of the power system 4. The power transmission and distribution business operator server 5 is also configured to allow bidirectional communication with the CEMS server 2. The power transmission and distribution business operator server 5 is an example of the "second server" or "another server" according to the present disclosure.

Electric Vehicle Supply Equipment and Vehicle Configuration

Figure 2:
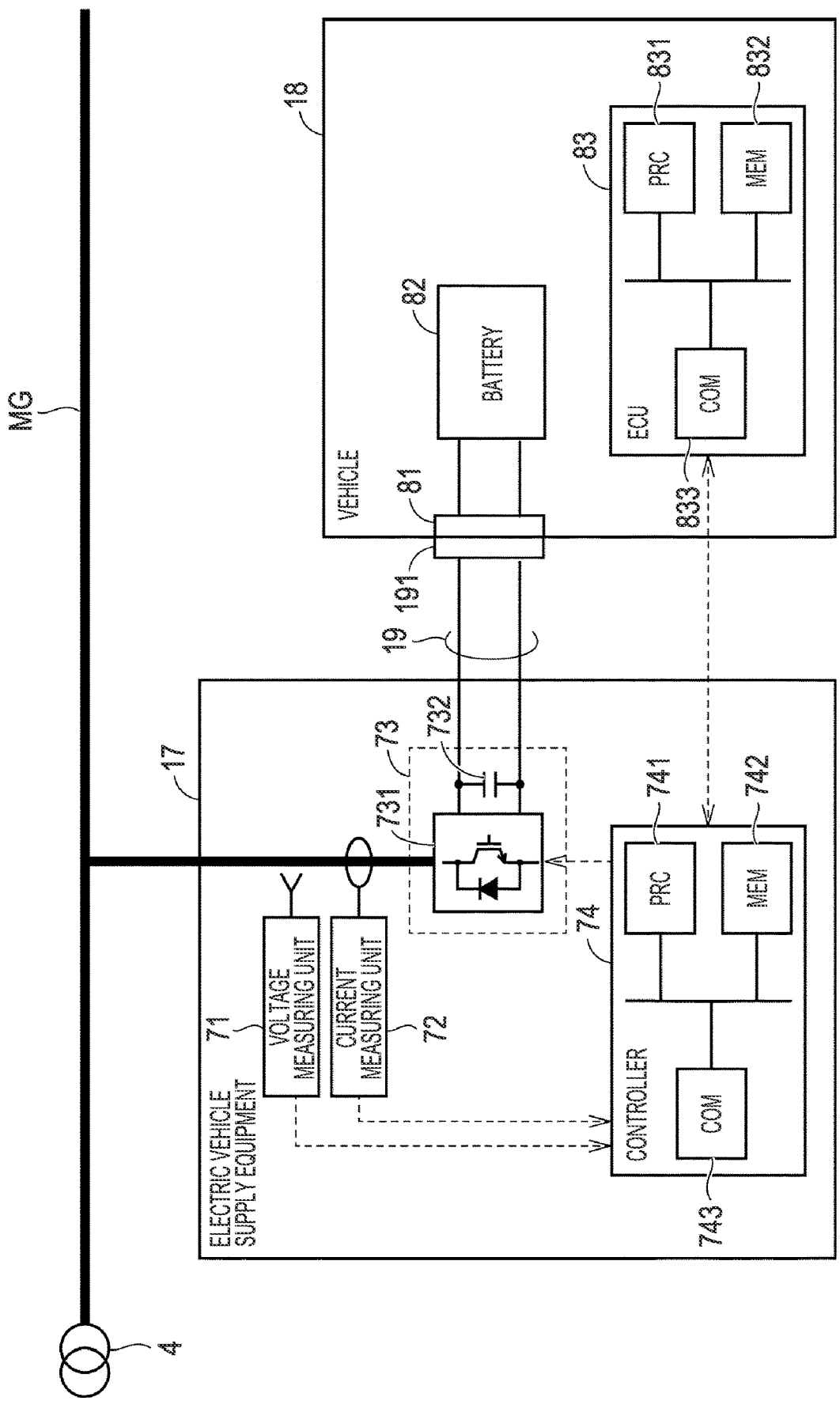
FIG. 2 is a diagram showing a configuration of electric vehicle supply equipment and a vehicle in more detail.

FIG. 2 is a diagram showing the configurations of the electric vehicle supply equipment 17 and the vehicle 18 in more detail. The electric vehicle supply equipment 17 is connected to the power distribution system of the microgrid MG. The electric vehicle supply equipment 17 includes a voltage measuring unit 71, a current measuring unit 72, a power conversion device 73, and a controller 74.

The voltage measuring unit 71 measures an alternating current voltage (a system voltage) at the connection point between the electric vehicle supply equipment 17 and the power distribution system. The current measuring unit 72 measures an alternating current (a system current) at the connection point between the electric vehicle supply equipment 17 and the power distribution system. The measured system voltage and system current are output to the controller 74.

The power conversion device 73 is configured to be capable of generating active power or generating reactive power using the power supplied from the microgrid MG according to the power command value from the controller 74. More specifically, the power conversion device 73 includes an inverter 731 and a capacitor 732 of a large capacity. The inverter 731 includes a plurality of switching elements capable of pulse width modulation (PWM) control of a three-phase alternating current (U phase, V phase, and W phase). The capacitor 732 is electrically connected to a direct current output side of the inverter 731. The power conversion device 73 may further include a direct current to direct current converter in addition to the inverter 731. For the configuration and operation of the power conversion device 73, for example, JP 2012-16072 A can be referred to.

The controller 74 generates a power command value (an active power command value and a reactive power command value) of the power conversion device 73 according to the voltage and current of the microgrid MG measured by the voltage measuring unit 71 and the current measuring unit 72.

The controller 74 includes a processor 741, such as a central processing unit (CPU), a memory 742, such as a read only memory (ROM) and a random access memory (RAM), an input/output (I/O) circuit (not shown), and a communication unit 743. The processor 741, the memory 742, the I/O circuit, and the communication unit 743 can transmit and receive data with each other via a bus. A program is stored in a partial area of the memory 742 in advance, and the processor 741 executes the program to implement the control of the power conversion device 73 (described later).

The vehicle 18 includes an inlet 81, a battery 82, and an electronic control unit (ECU) 83.

The inlet 81 is configured so that a charging plug 191 provided at the front end of the charging cable 19 can be inserted with mechanical connection such as fitting. When a user (a driver of the vehicle 18 or a worker of a charging station and the like) inserts the charging plug 191 into the inlet 81, the electric vehicle supply equipment 17 and the vehicle 18 are connected by the charging cable 19. As a result, an electrical connection for power transmission is secured between the electric vehicle supply equipment 17 and the vehicle 18, and various signals (a command, data, and the like) can be transmitted and received to and from each other.

The battery 82 is an assembled battery including a plurality of cells. Each cell is a secondary battery, such as a lithium ion battery or a nickel hydrogen battery. The battery 82 supplies power to generate the driving force of the vehicle 18. Further, the battery 82 stores the power generated by the in-vehicle motor generator (not shown). A capacitor such as an electric double layer capacitor may be used instead of the battery 82.

In the same manner as the controller 74 of the electric vehicle supply equipment 17, the ECU 83 includes a processor 831, a memory 832, an I/O circuit (not shown), and a communication unit 833. The processor 831 is configured to execute various controls of the vehicle 18, particularly various arithmetic processing relating to external charging control in the present embodiment. The memory 832 stores various information (a map, a relational expression, a parameter, and the like) used in the program executed by the processor 831. The communication unit 833 is configured to communicate with the outside (the controller 74 and the CEMS server 2).

In the electric vehicle supply equipment 17 and the vehicle 18 configured as described above, the controller 74 of the electric vehicle supply equipment 17 is configured to be capable of executing a "charging and discharging operation" for charging or discharging the vehicle 18 (the battery 82) with the microgrid MG. The controller 74 can suppress the voltage fluctuation of the microgrid MG by charging the vehicle 18 with the power of the microgrid MG or discharging the power of the vehicle 18 to the microgrid MG.

Further, the controller 74 is configured to be capable of executing a "reactive power compensation operation" that compensates for the reactive power of the microgrid MG by generating the reactive power from the progress to the delay in the electric vehicle supply equipment 17 at high speed and without steps. The controller 74 outputs the progress reactive power from the electric vehicle supply equipment 17 when the voltage rise of the microgrid MG is needed, and outputs the delay reactive power from the electric vehicle supply equipment 17 when the voltage drop of the microgrid MG is needed. As a result, by keeping the voltage of the microgrid MG constant, the voltage fluctuation of the power system 4 electrically connected to the microgrid MG can be suppressed. For details of the reactive power compensation operation, JP 2012-16072 A can be referred to.

In the present embodiment, a configuration is adopted in which the grant entity of the control authority of the electric vehicle supply equipment 17 is switched depending on whether the vehicle 18 is connected to the electric vehicle supply equipment 17. More specifically, when the vehicle 18 is connected to the electric vehicle supply equipment 17, the CEMS server 2 retains the control authority of the electric vehicle supply equipment 17 as usual. In this case, the CEMS server 2 causes the electric vehicle supply equipment 17 connected to the vehicle 18 to execute a charging and discharging operation.

On the other hand, when the vehicle 18 is not connected to the electric vehicle supply equipment 17, the control authority of the electric vehicle supply equipment 17 is given from the CEMS server 2 to the power transmission and distribution business operator server 5. In other words, when the vehicle 18 is not connected to the electric vehicle supply equipment 17, the electric vehicle supply equipment 17 is rented out to the power company that is the management source of the power transmission and distribution business operator server 5. The power transmission and distribution business operator server 5 causes the electric vehicle supply equipment 17 to execute the reactive power compensation operation. As a result, the electric vehicle supply equipment 17 to which the vehicle 18 is not connected can be effectively used for suppressing voltage fluctuations in the power system 4. Further, the administrator of the CEMS server 2 (the operating entity of the CEMS 1) can receive the compensation from the power company for lending the electric vehicle supply equipment 17 to the power company.

Processing Flow

Figure 3:
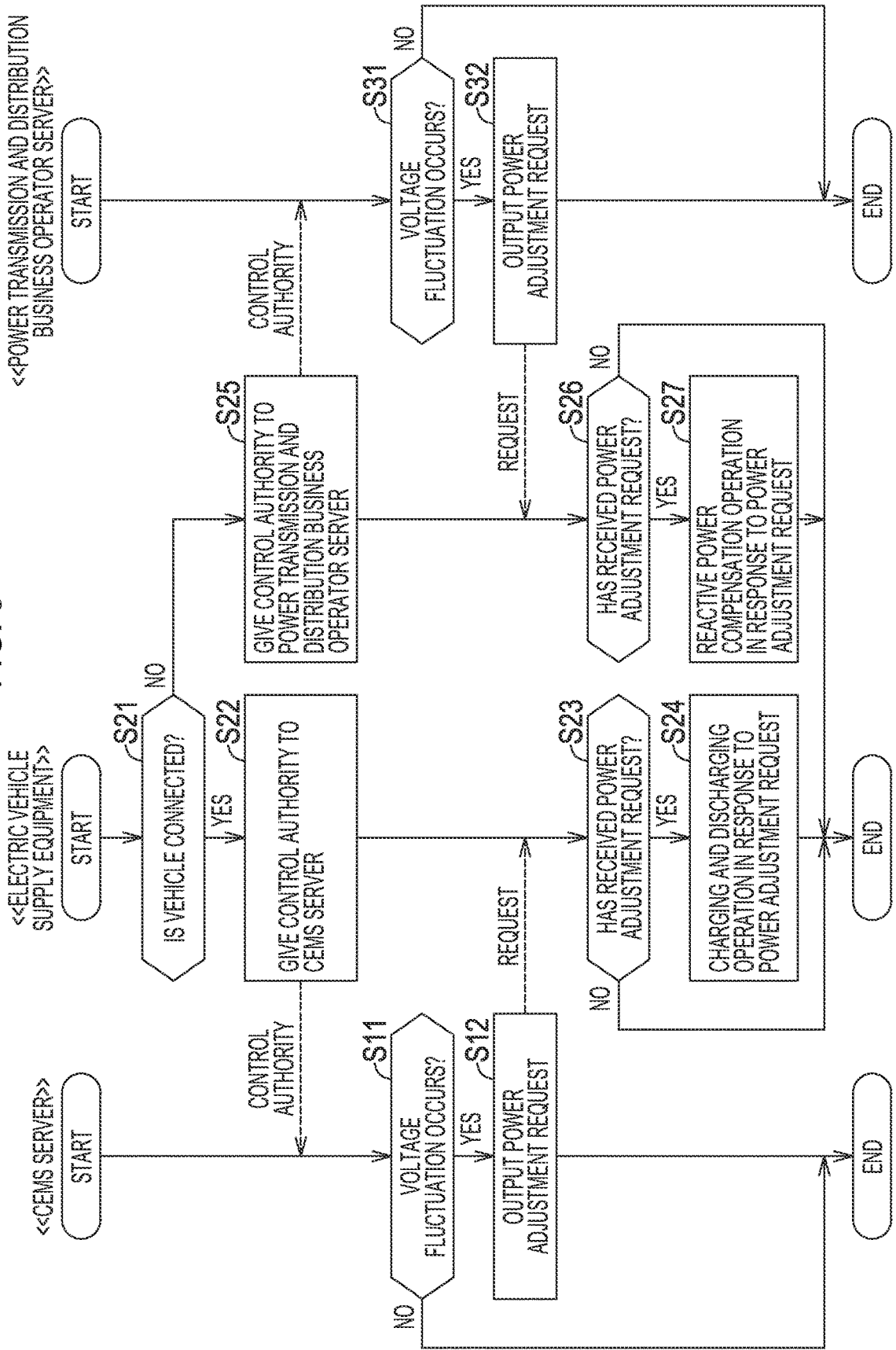
FIG. 3 is a flowchart for explaining a processing procedure of a series of processing executed by the electric vehicle supply equipment in the present embodiment.
Figure 4:
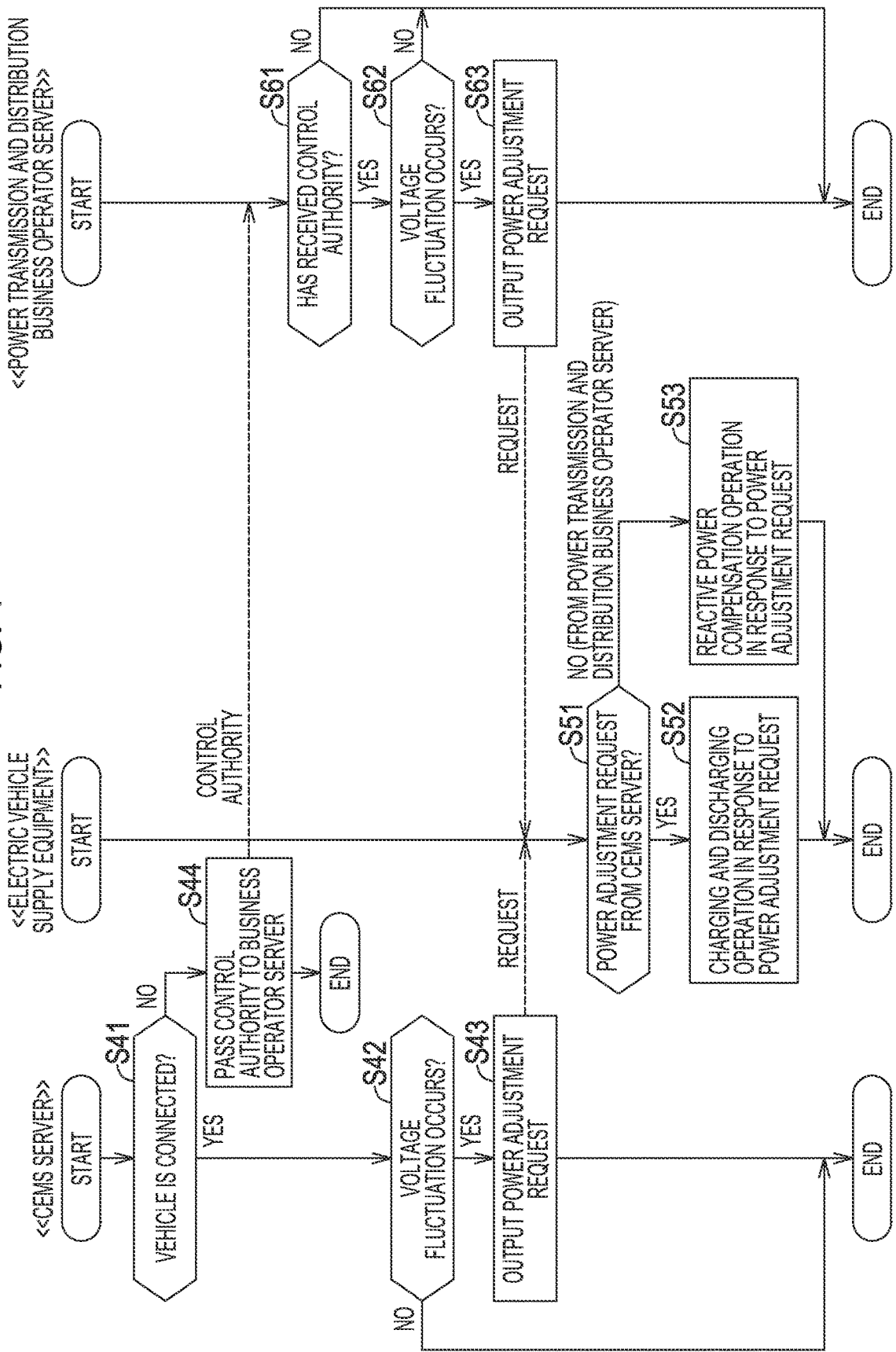
FIG. 4 is a flowchart for explaining a processing procedure of a series of processing executed by a CEMS server in the present embodiment.

FIG. 3 is a flowchart for explaining a processing procedure of a series of processing executed by the electric vehicle supply equipment 17 in the present embodiment. In the flowchart of FIG. 3 and FIG. 4 described later, the processing executed by the CEMS server 2 is shown on the left side, the processing executed by the electric vehicle supply equipment 17 (controller 74) is shown in the middle, and the processing executed by the power transmission and distribution business operator server 5 is shown on the right side. The flowchart is called and executed from a main routine (not shown) at predetermined intervals, for example. Each step is realized by software processing by a processor, but may be realized by hardware processing by large scale integration (LSI) and the like. Hereinafter, the step is abbreviated as S.

In step S21, the electric vehicle supply equipment 17 determines whether the vehicle 18 is connected to the electric vehicle supply equipment 17 via the charging cable 19. Here, rather than a situation in which the departure time of the vehicle 18 is approaching and the vehicle 18 is requested to be charged immediately, a situation is assumed in which the vehicle 18 is in a state where the vehicle 18 can be charged and discharged such as a case where there is some time to spare before the time at which charging starts according to the charging schedule.

When the vehicle 18 is connected to the electric vehicle supply equipment 17 (YES in step S21), the electric vehicle supply equipment 17 gives the control authority of the electric vehicle supply equipment 17 to the CEMS server 2 (step S22). On the other hand, when the vehicle 18 is not connected to the electric vehicle supply equipment 17 (NO in step S21), the electric vehicle supply equipment 17 gives the control authority of the electric vehicle supply equipment 17 to the power transmission and distribution business operator server 5 (step S25).

When the CEMS server 2 receives the control authority of the electric vehicle supply equipment 17, the CEMS server 2 determines whether the voltage fluctuation of the microgrid MG occurs due to the occurrence of surplus power or the occurrence of power shortage, and the like in the microgrid MG in step S11 (whether there is a situation in which the voltage fluctuation of the microgrid MG can occur) (step S11). When the voltage fluctuation of the microgrid MG occurs (YES in step S11), the CEMS server 2 outputs a power adjustment request to suppresses the voltage fluctuation of the microgrid MG, more specifically, a charging request to store surplus power or a discharging request to compensate for the power shortage, to the electric vehicle supply equipment 17 (step S12). When the voltage fluctuation of the microgrid MG does not occur (NO in step S11), the processing of step S12 is skipped.

In step S23, the electric vehicle supply equipment 17 determines whether a power adjustment request has been received from the CEMS server 2. When the power adjustment request is received (YES in step S23), the electric vehicle supply equipment 17 proceeds to step S24 and charges or discharges the vehicle 18 in response to the power adjustment request (the charging and discharging operation). That is, the electric vehicle supply equipment 17 charges the vehicle 18 when the electric vehicle supply equipment 17 receives a charging request to store surplus power, and discharges the vehicle 18 when the electric vehicle supply equipment 17 receives a discharging request to compensate for the power shortage. As a result, the voltage fluctuation of the microgrid MG is suppressed. After that, the electric vehicle supply equipment 17 returns the processing to the main routine. When the power adjustment request is received (NO in step S23), the processing of step S24 is skipped.

On the other hand, when the power transmission and distribution business operator server 5 receives the control authority of the electric vehicle supply equipment 17, the power transmission and distribution business operator server 5 determines whether the voltage fluctuation of the power system 4 occurs in step S31 (whether the situation in which the voltage fluctuation of the power system 4 can occur is in place). When the voltage fluctuation of the power system 4 occurs (YES in step S31), the power transmission and distribution business operator server 5 outputs a power adjustment request to suppress the voltage fluctuation of the power system 4, more specifically, a request of the reactive power compensation operation to the electric vehicle supply equipment 17 (step S32). When the voltage fluctuation of the power system 4 does not occur (NO in step S11), the processing of step S32 is skipped.

In step S26, the electric vehicle supply equipment 17 determines whether a power adjustment request has been received from the power transmission and distribution business operator server 5. When the power adjustment request is received (YES in step S26), the electric vehicle supply equipment 17 executes the reactive power compensation operation in response to the power adjustment request and outputs the reactive power to the microgrid MG (step S27). As a result, the voltage fluctuation of the power system 4 is suppressed. After that, the electric vehicle supply equipment 17 returns the processing to the main routine. When the power adjustment request is received (NO in step S26), the processing of step S27 is skipped.

In the example of FIG. 3, a configuration in which the restriction authority of the electric vehicle supply equipment 17 is managed by the electric vehicle supply equipment 17 itself has been described. However, the management technique of the restriction authority of the electric vehicle supply equipment 17 is not limited thereto. For example, as described below, the CEMS server 2 may manage the restriction authority (that may be referred to as command authority) of the electric vehicle supply equipment 17.

FIG. 4 is a flowchart for explaining a processing procedure of a series of processing executed by the CEMS server 2 in the present embodiment. In step S41, the CEMS server 2 determines whether the vehicle 18 is connected to the electric vehicle supply equipment 17. The CEMS server 2 can acquire whether the vehicle 18 is connected to the electric vehicle supply equipment 17 by communicating with the electric vehicle supply equipment 17.

When the vehicle 18 is connected to the electric vehicle supply equipment 17 (YES in step S41), the CEMS server 2 retains the restriction authority of the electric vehicle supply equipment 17 by itself. The CEMS server 2 determines whether the voltage fluctuation of the microgrid MG occurs due to the occurrence of surplus power or the occurrence of power shortage, and the like in the microgrid MG (step S42). When the voltage fluctuation of the microgrid MG occurs (YES in step S42), the CEMS server 2 outputs a power adjustment request to suppress the voltage fluctuation of the microgrid MG, more specifically, a charging request to store surplus power or a discharging request to compensate for the power shortage, to the electric vehicle supply equipment 17 (step S43). When the voltage fluctuation of the microgrid MG does not occur (NO in step S42), the processing of step S43 is skipped.

On the other hand, when the vehicle 18 is not connected to the electric vehicle supply equipment 17 (NO in step S41), the CEMS server 2 gives the control authority of the electric vehicle supply equipment 17 to the power transmission and distribution business operator server 5. When the power transmission and distribution business operator server 5 receives the control authority of the electric vehicle supply equipment 17 from the CEMS server 2 (YES in step S61), the power transmission and distribution business operator server 5 determines whether the voltage fluctuation of the power system 4 occurs (step S62). When the voltage fluctuation of the power system 4 occurs (YES in step S62), the power transmission and distribution business operator server 5 outputs a power adjustment request to suppress the voltage fluctuation of the power system 4 (a request of the reactive power compensation operation) to the electric vehicle supply equipment 17 (step S63). When the voltage fluctuation of the power system 4 does not occur (NO in step S62), the processing of step S63 is skipped.

In step S51, the electric vehicle supply equipment 17 determines whether the power adjustment request is from the CEMS server 2. When the power adjustment request is from the CEMS server 2 (YES in step S51), the electric vehicle supply equipment 17 charges or discharges the vehicle 18 in response to the power adjustment request (step S52). On the other hand, when the power adjustment request is not from the CEMS server 2 (NO in step S51), that is, when the power adjustment request is from the power transmission and distribution business operator server 5, the electric vehicle supply equipment 17 executes the reactive power compensation operation in response to the power adjustment request, and outputs the reactive power to the microgrid MG (step S53). After that, the electric vehicle supply equipment 17 returns the processing to the main routine.

As described above, in the present embodiment, the control authority of the electric vehicle supply equipment 17 is exchanged between the CEMS server 2 and the power transmission and distribution business operator server 5 depending on whether the vehicle 18 is connected to the electric vehicle supply equipment 17. When the vehicle 18 is not connected to the electric vehicle supply equipment 17, the CEMS server 2 (the operating entity of the CEMS 1) lends the electric vehicle supply equipment 17 to the power transmission and distribution business operator server 5 (the power company that manages the power transmission and distribution business operator server 5) instead of leaving the electric vehicle supply equipment 17 unused. By causing the electric vehicle supply equipment 17, which is not connected to the vehicle 18 and cannot execute the charging and discharging operation, to execute the reactive power compensation operation, the electric vehicle supply equipment 17 can be effectively used to suppress the voltage fluctuation of the power system 4. Therefore, according to the present embodiment, the voltage fluctuation of the microgrid MG and the power system 4 can be suppressed by appropriately using the electric vehicle supply equipment 17 that is a power adjustment resource.

Further, the CEMS server 2 can receive the compensation for lending the electric vehicle supply equipment 17 from the power transmission and distribution business operator server 5. The compensation can be determined by an amount according to the number of times or the period, and the like in which the electric vehicle supply equipment 17 has actually executed the reactive power compensation operation. The compensation may be an amount according to the number of times or the period, and the like in which the control authority is given from the CEMS server 2 to the power transmission and distribution business operator server 5. However, the method of determining the compensation is not limited thereto. The compensation may be an amount determined in units of a predetermined period (flat rate system).

The embodiments disclosed this time should be considered to be exemplary and not restrictive in all respects. The scope of the present disclosure is set forth by the claims rather than the description of the embodiments, and is intended to include all modifications within the meaning and scope of the claims.

What is claimed is:
1. A power management system comprising:
a power system;
a microgrid configured to exchange power with the power system, wherein the microgrid includes a plurality of power adjustment resources connected to each other, wherein the plurality of power adjustment resources includes electric vehicle supply equipment;

a first server belonging to an aggregator and configured to communicate with the plurality of power adjustment resources; and a second server belonging to a business operator of the power system and configured to communicate with the first server, wherein the second server is further configured to communicate with the electric vehicle supply equipment without intervention of the first server, wherein the electric vehicle supply equipment includes a processor configured to:

determine whether a vehicle is electrically connected to the electric vehicle supply equipment, wherein the processor transmits a first signal to the first server in response to a determination that the vehicle is electrically connected to the electric vehicle supply equipment, wherein the first signal gives the first server authority to control operation of the electric vehicle supply equipment, and the processor transmits a second signal to the second server in response to a determination that the vehicle is not electrically connected to the electric vehicle supply equipment, wherein the second signal gives the second server authority to control operation of the electric vehicle supply equipment;

determine whether the electric vehicle supply equipment has received a first power adjustment request from the first server, wherein the processor causes the electric vehicle supply equipment to start charging and discharging a battery of the vehicle to suppress voltage fluctuation in the microgrid in response to a determination that the electric vehicle supply equipment has received the first power adjustment request; and determine whether the electric vehicle supply equipment has received a second power adjustment request from the second server, wherein the processor causes the electric vehicle supply equipment to output reactive power to the microgrid so as to maintain a voltage of the microgrid at a constant voltage value to suppress voltage fluctuation in the power system in response to a determination that the electric vehicle supply equipment has received the second power adjustment request.

2. The power management system according to claim 1, wherein the first server is further configured to:

determine whether the voltage fluctuation is occurring in the microgrid; and transmit the first power adjustment request to the electric vehicle supply equipment in response to a determination that the voltage fluctuation is occurring in the microgrid.

3. The power management system according to claim 1, wherein the second server is further configured to:

determine whether the voltage fluctuation is occurring in the power system; and transmit the second power adjustment request to the electric vehicle supply equipment in response to a determination that the voltage fluctuation is occurring in the power system.

4. The power management system according to claim 1, wherein:

the second server is further configured to pay compensation perform a payment process to make a payment to the aggregator via the first server according to the number of times the processor executed the output of the reactive power in response to the second power adjustment request from the second server, or according to a period in which the processor executed the output of the reactive power in response to the second power adjustment request from the second server.

5. The power management system according to claim 1, further comprising power receiving and transforming equipment configured to connect and disconnect the microgrid to and from the power system.

* * * * *